United States Patent
Taaghol et al.

(10) Patent No.: US 8,325,679 B2
(45) Date of Patent: Dec. 4, 2012

(54) INTERWORKING OF NETWORKS WITH SINGLE RADIO HANDOVER

(75) Inventors: Pouya Taaghol, San Jose, CA (US); Puneet Jain, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 242 days.

(21) Appl. No.: 12/718,107

(22) Filed: Mar. 5, 2010

(65) Prior Publication Data

US 2011/0216744 A1    Sep. 8, 2011

(51) Int. Cl.
*H04W 4/00*    (2009.01)
*H04W 36/00*   (2009.01)
*H04L 12/28*   (2006.01)

(52) U.S. Cl. ........ 370/331; 370/332; 370/254; 370/338; 455/426.1; 455/434; 455/436

(58) Field of Classification Search ............... 455/426.1, 455/434, 436, 552.1; 370/252, 254, 311, 370/312, 328, 331, 332, 338, 352
See application file for complete search history.

(56) References Cited

U.S. PATENT DOCUMENTS

| | | | |
|---|---|---|---|
| 2006/0140150 A1 | 6/2006 | Olvera-Hernandez et al. | |
| 2007/0076649 A1* | 4/2007 | Lin et al. | 370/328 |
| 2008/0101291 A1* | 5/2008 | Jiang et al. | 370/331 |
| 2008/0102843 A1 | 5/2008 | Todd et al. | |
| 2009/0046682 A1* | 2/2009 | Kim et al. | 370/338 |
| 2009/0207812 A1* | 8/2009 | Gupta et al. | 370/332 |
| 2009/0279502 A1* | 11/2009 | Zheng et al. | 370/331 |
| 2009/0285176 A1* | 11/2009 | Zheng et al. | 370/331 |
| 2010/0304737 A1* | 12/2010 | Jain et al. | 455/426.1 |
| 2011/0044286 A1* | 2/2011 | Jain | 370/331 |
| 2011/0047289 A1* | 2/2011 | Venkatachalam et al. | 709/237 |
| 2011/0058531 A1* | 3/2011 | Jain et al. | 370/331 |
| 2011/0158161 A1* | 6/2011 | Jain | 370/328 |
| 2011/0255459 A1* | 10/2011 | Gupta et al. | 370/312 |
| 2011/0261787 A1* | 10/2011 | Bachmann et al. | 370/331 |

FOREIGN PATENT DOCUMENTS

KR    10-0785303 B1    12/2007
WO    2011/109189 A2    9/2011

OTHER PUBLICATIONS

International Search Report and Written Opinion received for PCT Patent Application No. PCT/US2011/025727, mailed on Oct. 27, 2011, 10 pages.

Oyman et al., U.S. Appl. No. 12/454,505, titled "Apparatus and Methods for Multi-Radio Coordination of Heterogeneous Wireless Networks", filed May 18, 2009.

* cited by examiner

*Primary Examiner* — Dwayne Bost
*Assistant Examiner* — Scott Trandai
(74) *Attorney, Agent, or Firm* — Schwegman, Lundberg & Woessner, P.A.

(57) ABSTRACT

Embodiments of systems and methods for interworking of networks using a single radio handover are generally described herein. Other embodiments may be described and claimed.

17 Claims, 10 Drawing Sheets

INTERWORKING OF NETWORKS WITH SINGLE RADIO HANDOVER

TECHNICAL FIELD

The present disclosure relates generally to the field of wireless communications and more particularly to interworking of networks using radio systems having multi-networking capabilities across heterogeneous networks.

BACKGROUND

As wireless communication becomes increasingly popular at offices, homes, and schools, different wireless technologies and applications may be available to meet the demand for computing and communications at anytime and/or anywhere. For example, a variety of wireless communication networks may co-exist to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide an even broader range as such networks are widely deployed in cellular infrastructure. Although each of the above-mentioned wireless communication networks may support different usages, an ability to interwork seamlessly across two or more of these networks would be useful.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
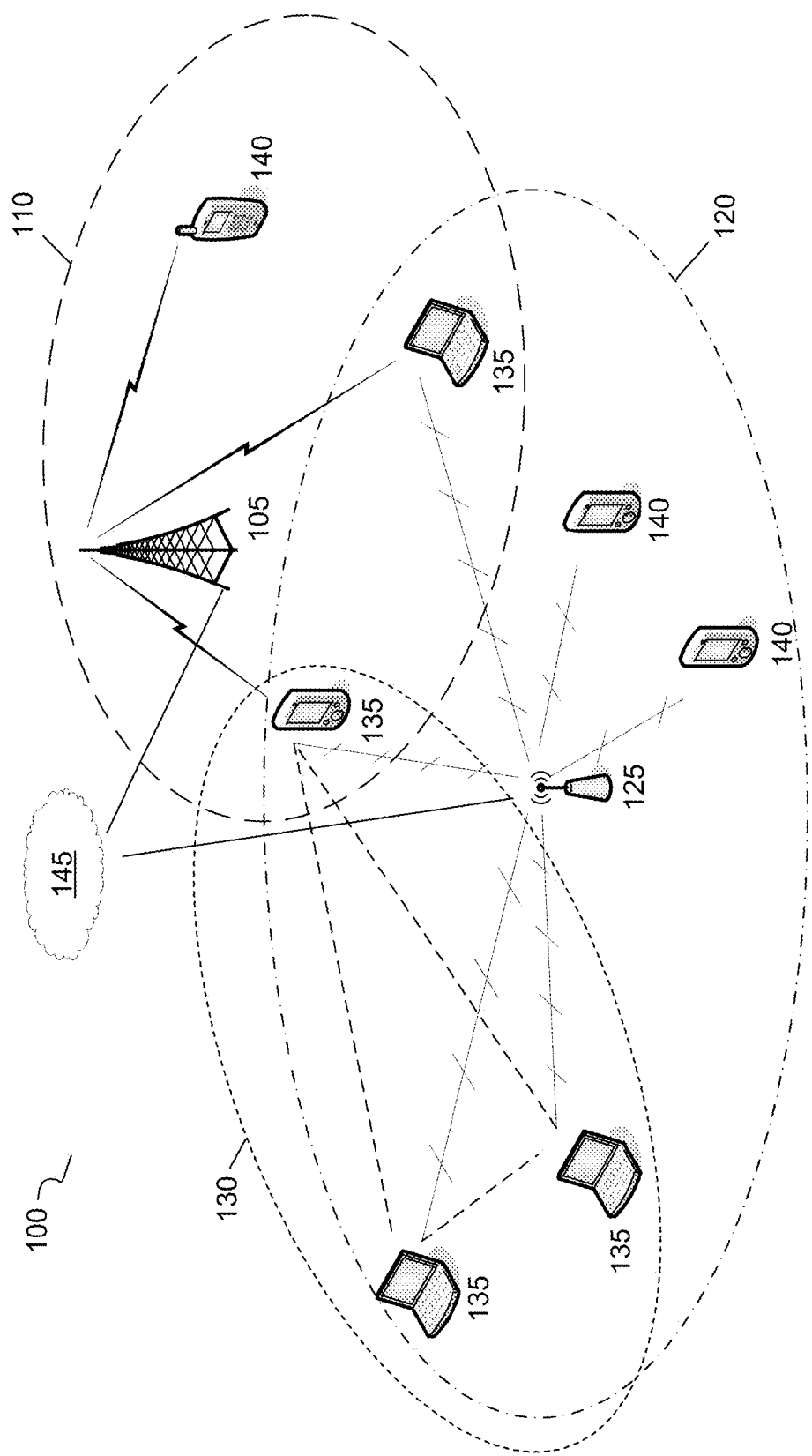
FIG. 1 illustrates wireless networks in accordance with some embodiments.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details for providing interworking of networks using single radio handover are set forth to provide a thorough understanding of the invention. However, it will be understood by those skilled in the art that the present invention may be practiced without these specific details. In other instances, well-known methods, procedures, components and circuits have not been described in detail so as not to obscure the present invention.

It would be an advance in the art to provide a system and methods for the interworking of networks using a multi-radio system or a system having a single radio that lacks a capability to operate on two separate networks at or nearly at the same time over a shared radio. The interworking of networks in this manner may allow for the use of single credentials for authentication, roaming, integrated billing, and optimized handover for systems such as platforms, stations (STA), mobile STAs, advanced mobile STAs, and subscriber STAs.

For example, a first network such as a Wireless Fidelity (WiFi) network may be used to access a second network such as a Worldwide Interoperability for Microwave Access (WiMAX) network using single radio handover. In this embodiment, the WiFi network is a WLAN and the WiMAX network is a WWAN. WiFi is widely available in many public places, enterprises, and residential environments. Due to its unlicensed nature, WiFi may not cover very large areas whereas WiMAX is a cellular technology designed for covering large outdoor environments. But, WiMAX may not provide adequate coverage in indoor environments. A combination of one or more WLANs and one or more WiMAX networks can potentially provide a ubiquitous indoor and outdoor coverage. Systems and methods for interworking between networks that provide a transition from one network to another in a transparent manner without meaningful or noticeable interruption to a user's active session or sessions would be useful.

Now turning to the figures, FIG. 1 illustrates a wireless communication system 100 in accordance with some embodiments of the invention. The wireless communication system 100 may include one or more wireless networks, generally shown as 110, 120, and 130. In particular, the wireless communication system 100 may include a wireless wide-area network (WWAN) 110, a wireless local area network (WLAN) 120, and a wireless personal area network (WPAN) 130. Although FIG. 1 depicts three wireless networks, the wireless communication system 100 may include additional or fewer wireless communication networks. For example, the wireless communication system 100 may include one or more wireless personal area networks (WPANs), additional WLANs, WWANs, and/or WMANs. The methods and apparatus described herein are not limited in this regard.

The wireless communication system 100 also includes one or more stations (STA)s including platforms, clients, subscriber stations, mobile stations, and advanced mobile stations generally shown as multi-radio stations 135 capable of accessing a plurality of wireless networks using a plurality of radios, and single-radio stations 140 that may lack the capability to operate two different radios at or nearly the same time since the STA is configured with a single radio frequency (RF) module or communications device. For example, the STAs 135 and 140 may include wireless electronic devices such as a desktop computer, a laptop computer, a handheld computer, a tablet computer, a cellular telephone, a smartphone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts seven STAs, the wireless communication system 100 may include more or less STAs 135 and 140.

The STAs 135 and 140 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), multi-carrier modulation (MDM), and/or other suitable modulation techniques to communicate via wireless links.

In an embodiment, the STAs 135 and 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the STAs 135 and 140 may communicate with other STAs 135 and 140 in the WLAN 120 or an access point 125 via wireless links. The AP 125 may be operatively coupled to a router (not shown). Alternatively, the AP 125 and the router may be integrated into a single device (e.g., a wireless router).

The STAs (e.g. multi-radio station 135 and a single-radio station 140) may use OFDM or OFDMA modulation to transmit large amounts of digital data by splitting a radio frequency signal into multiple small sub-signals, which in turn, are transmitted simultaneously at different frequencies. In particular, the STAs 135 and 140 may use OFDMA modulation to implement the WWAN 110. For example, the STAs may operate in accordance with the 802.16 family of standards developed by IEEE to provide for fixed, portable, and/or mobile broadband wireless access (BWA) networks (e.g., the IEEE std. 802.16, published 2004) to communicate with a base station or advanced base station 105, via wireless link(s).

Although some of the above examples are described above with respect to particular standards developed by IEEE, the methods and apparatus disclosed herein are readily applicable to many specifications and/or standards developed by other special interest groups and/or standard development organizations (e.g., Wireless Fidelity (WiFi) Alliance, Worldwide Interoperability for Microwave Access (WiMAX) Forum, Infrared Data Association (IrDA), Third Generation Partnership Project (3GPP), etc.). In some embodiments, access point 125 and/or base station 105 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for WLANs, although the scope of the invention is not limited in this respect as they may also be suitable to transmit and/or receive communications in accordance with other techniques and standards. In some embodiments, access point 125 and/or base station 105 may communicate in accordance with the IEEE 802.16-2004, the IEEE 802.16(e), and the IEEE 802.16(m) standards including variations and evolutions thereof, although the scope of the invention is not limited in this respect as they may also be suitable to transmit and/or receive communications in accordance with other techniques and standards.

For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

The WWAN 110 and WLAN 120 may be operatively coupled to a common public or private network 145 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to a common public or private network 145 via the AP 125 and the WWAN 110 may be operatively coupled to the common public or private network 145 via the base station 105.

The STAs 135 and 140 may operate in accordance with other wireless communication protocols to support the WWAN 110. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Long Term Evolution (LTE), Universal Mobile Telecommunications System (UMTS) technology, standards based on these technologies, variations and evolutions of these standards, and/or other suitable wireless communication standards.

The wireless communication system 100 may further include other WPAN, WLAN, WWAN, and/or WMAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
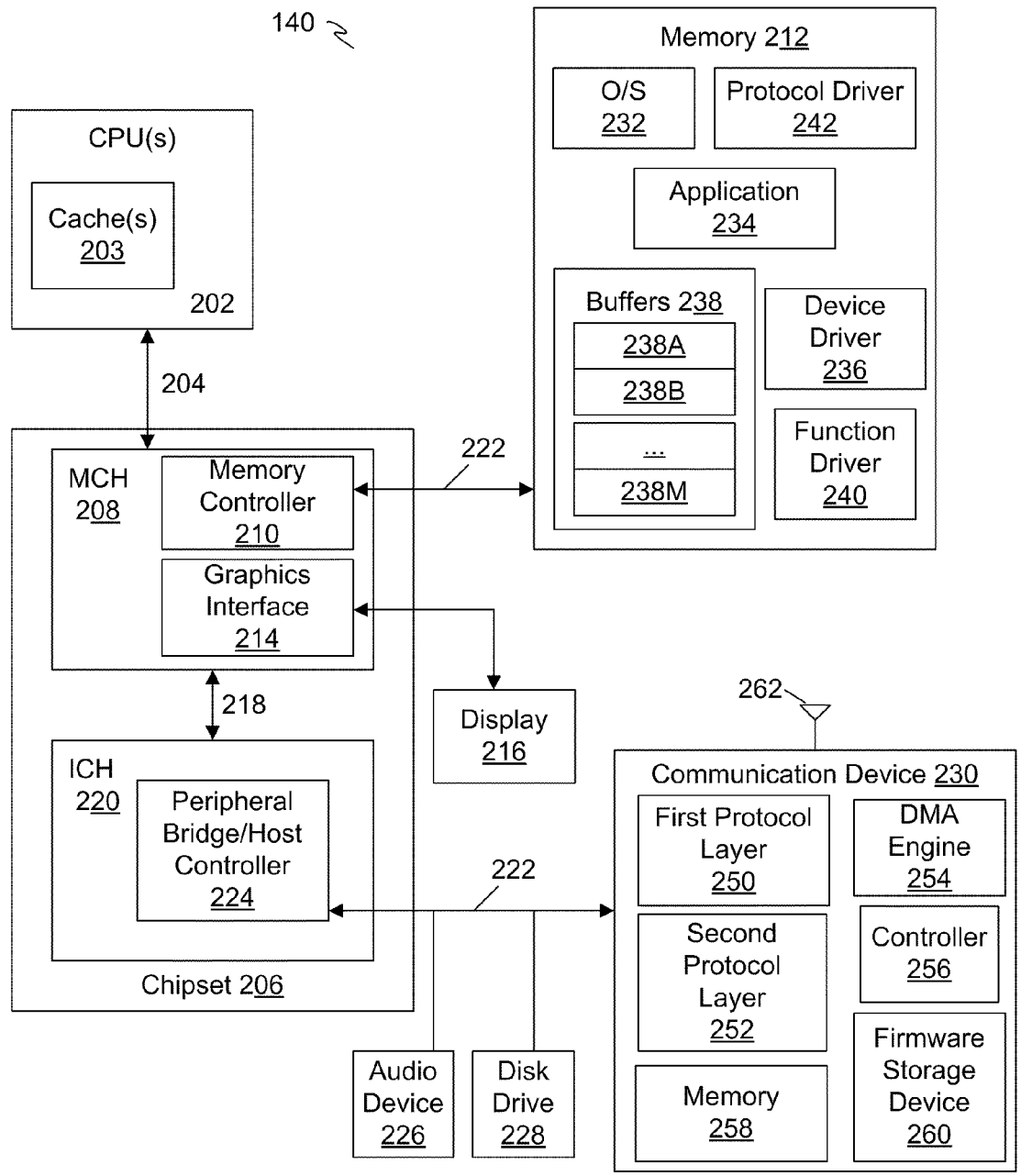
FIG. 2 illustrates a block diagram of a station (STA) in accordance with various embodiments.

FIG. 2 illustrates a block diagram of the single radio station 140 in accordance with various embodiments of the invention. The single radio station 140 may include one or more host processors or central processing unit(s) (CPUs) 202 (which may be collectively referred to herein as "processors 202" or more generally "processor 202") coupled to an interconnection network or bus 204. The processors 202 may be any type of processor such as a general purpose processor, a network processor (which may process data communicated over a computer network), etc. (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors.

The processor 202 may include one or more caches 203, which may be private and/or shared in various embodiments. Generally, a cache 203 stores data corresponding to original data stored elsewhere or computed earlier. To reduce memory access latency, once data is stored in a cache 203, future use may be made by accessing a cached copy rather than refetching or recomputing the original data. The cache 203 may be any type of cache, such a level 1 (L1) cache, a level 2 (L2) cache, a level 3 (L-3), a mid-level cache, a last level cache (LLC), etc. to store electronic data (e.g., including instructions) that is utilized by one or more components of the multi-com platform 200.

A chipset 206 may additionally be coupled to the interconnection network 204. The chipset 206 may include a memory control hub (MCH) 208. The MCH 208 may include a memory controller 210 that is coupled to a memory 212. The memory 212 may store data, e.g., including sequences of instructions that are executed by the processor 202, or any other device in communication with components of the single radio station 140. In various embodiments, the memory 212 may include one or more volatile storage or memory devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 204, such as multiple processors and/or multiple system memories.

The MCH 208 may further include a graphics interface 214 coupled to a display 216, e.g., via a graphics accelerator. In various embodiments, the display device 216, which, for example may include a flat panel display or a cathode ray tube, may be coupled to the graphics interface 214 through, for example, a signal converter that translates a digital representation of an image stored in a storage device such as video memory or system memory into display signals that are interpreted and displayed by the display. The display signals produced by the display device 216 may pass through various control devices before being interpreted by and subsequently displayed on the display device 216.

As shown in FIG. 2, a hub interface 218 may couple the MCH 208 to an input/output control hub (ICH) 220. The ICH 220 may provide an interface to input/output (I/O) devices coupled to the single radio station 140. The ICH 220 may be coupled to a bus 222 through a peripheral bridge or host controller 224, such as a peripheral component interconnect (PCI) bridge, a universal serial bus (USB) controller, etc. The controller 224 may provide a data path between the processor 202 and peripheral devices. Other types of topologies may be utilized. Also, multiple buses may be coupled to the ICH 220, for example, through multiple bridges or controllers. For example, the bus 222 may comply with the Universal Serial Bus Specification, Revision 1.1, Sep. 23, 1998, and/or Universal Serial Bus Specification, Revision 2.0, Apr. 27, 2000 (including subsequent amendments to either revision). Alternatively, the bus 222 may comprise other types and configurations of bus systems. Moreover, other peripherals coupled to the ICH 220 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 222 may be coupled to an audio device 226, one or more rotating or solid state disk drive(s) 228, and a communication device 230, which in various embodiments may be a network interface card (NIC) or a tuner card. Other devices may be coupled to the bus 222. Also, various components such as the communication device 230 may be coupled to the MCH 208 in various embodiments. In addition, the processor 202 and the MCH 208 may be combined to form a single chip.

Additionally, the single radio station 140 may include volatile and/or nonvolatile memory or storage. For example, nonvolatile memory may include one or more of the following: read-only memory (ROM), programmable ROM (PROM), erasable PROM (EPROM), electrically EPROM (EEPROM), a disk drive or solid state drive (e.g., 228), a floppy disk, a compact disk ROM (CD-ROM), a digital versatile disk (DVD), flash memory, a magneto-optical disk, or other types of nonvolatile machine-readable media capable of storing electronic data including instructions.

The memory 212 may include one or more of the following in various embodiments: an operating system (O/S) 232, application 234, device driver 236, buffers 238, function driver 240, and/or protocol driver 242. Programs and/or data stored in the memory 212 may be swapped into the solid state drive 228 as part of memory management operations. The processor(s) 302 executes various commands and processes one or more packets 246 with one or more computing devices coupled to a WLAN 120 or a WWAN 110. In various embodiments, a packet may be a sequence of one or more symbols and/or values that may be encoded by one or more electrical signals transmitted from at least one sender to at least one receiver (e.g., over a network such as the network 102). For example, each packet may have a header that includes information that may be utilized in routing and/or processing of the packet may comprise the continuity counter, a sync byte, source address, a destination address, packet type, etc. Each packet may also have a payload that includes the raw data or content the packet is transferring between various stations.

In various embodiments, the application 234 may utilize the O/S 232 to communicate with various components of the single radio station 140, e.g., through the device driver 236 and/or function driver 240. For example, the device driver 236 and function driver 240 may be used for different categories, e.g., device driver 236 may manage generic device class attributes, whereas the function driver 240 may manage device specific attributes (such as USB specific commands). In various embodiments, the device driver 236 may allocate one or more buffers to store packet data.

As illustrated in FIG. 2, the communication device 230 includes a first network protocol layer 250 and a second network protocol layer 252 for implementing the physical communication layer to send and receive network packets to and from the base station 105, the access point 125, and/or other STAs (e.g. multi-radio station 135 and single-radio station 140). The communication device 230 may further include a direct memory access (DMA) engine 252, which may write packet data to buffers 238 to transmit and/or receive data. Additionally, the communication device 230 may include a controller 254, which may include logic, such as a programmable processor for example, to perform communication device related operations. In various embodiments, the controller 254 may be a MAC (media access control) component. The communication device 230 may further include a memory 256, such as any type of volatile/nonvolatile memory (e.g., including one or more cache(s) and/or other memory types discussed with reference to memory 212), and an antenna 262. The antenna 262 may represent a single structure or an array of multiple structures for the reception and/or transmission of signals.

In various embodiments, the communication device 230 may include a firmware storage device 260 to store firmware (or software) that may be utilized in management of various functions performed by components of the communication device 230. The storage device 260 may be any type of a storage device such as a non-volatile storage device. For example, the storage device 260 may include one or more of the following: ROM, PROM, EPROM, EEPROM, disk drive, floppy disk, CD-ROM, DVD, flash memory, a magneto-optical disk, or other types of nonvolatile machine-readable media capable of storing electronic data, including instructions.

In various embodiments, bus 222 may comprise a USB bus. Isochronous mode is one of the four data flow types for USB devices (the others being Control, Interrupt and Bulk). Isochronous mode is commonly used for streaming multimedia data types such as video or audio sources. In isochronous mode, a device can reserve bandwidth on the bus making isochronous mode desirable for multimedia applications. Single radio STAs 140 may be configured to communicate on two networks, such as a WWAN 110 and a WLAN 120 using the same communication device 230, though not simultaneously. This can make interworking between networks difficult since network entry could take a relatively long period of time resulting in interruption of service or the loss of service.

Figure 3:
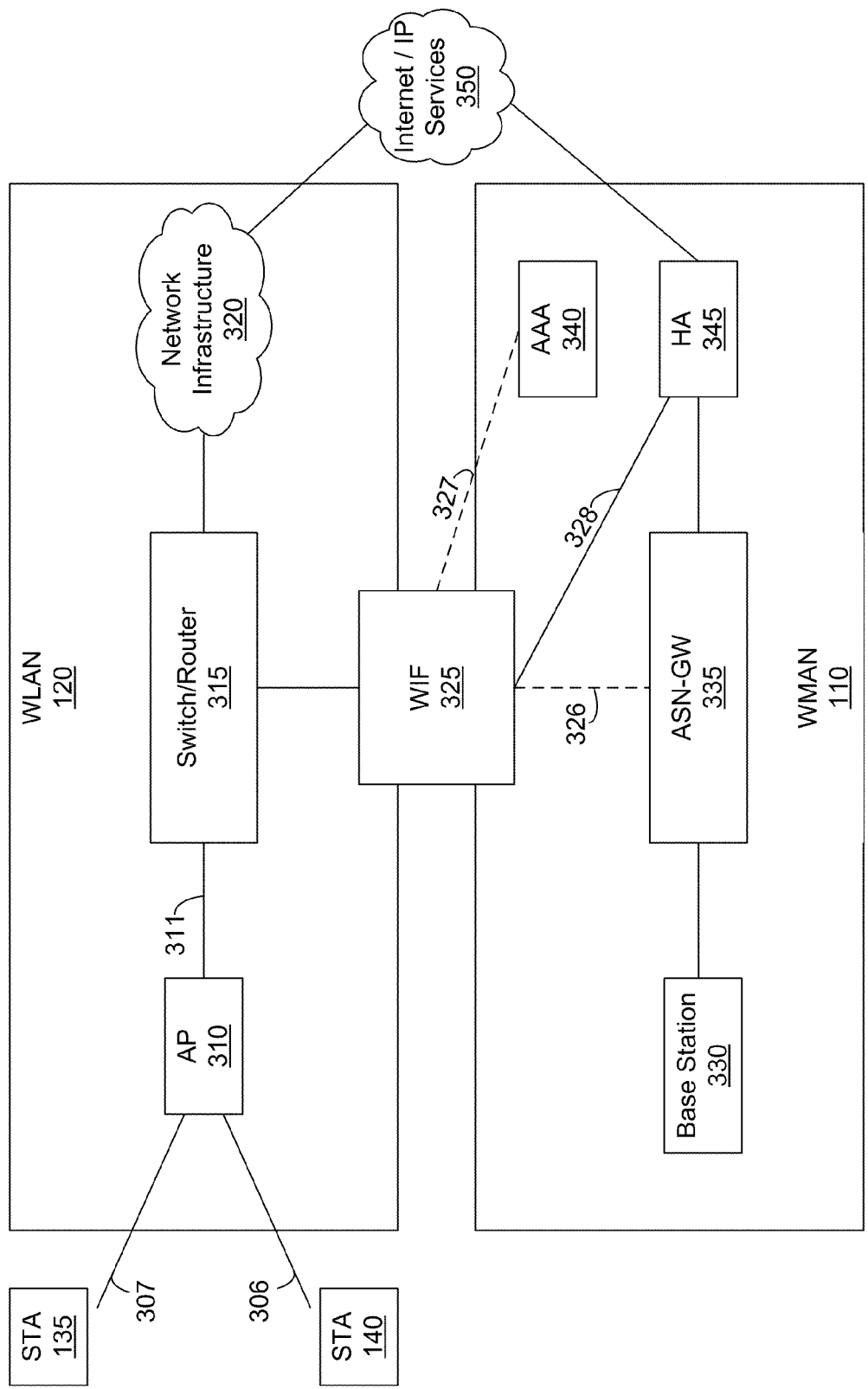
FIG. 3 is a block diagram of an architecture for the interworking of networks in accordance with some embodiments.

FIG. 3 is a block diagram of a system for the interworking of networks in accordance with some embodiments. The single radio station 140 establishes access to the WLAN 120 through an interworking access point (AP) 125 using a first service set identifier (SSID) 306. In an alternate embodiment, the interworking AP 310 is a carrier-class WiFi access point that separates STAs having network interworking capabilities from other STAs and/or the first SSID 306 is a broadcast SSID (BSSID). The single radio station 140 communicates with the interworking AP 310 over user traffic using the first SSID 306 wherein the SSID is mapped into a separate virtual local area network (VLAN). Devices, such as the single radio station 140 that are provisioned to interwork between networks can search for an interworking SSID in the WLAN 120. The interworking AP 310 may communicate with a plurality of STAs including single radio stations 140 with or without network interworking capabilities. Further, the interworking AP may also communicate with one or more other STAs including multi-radio STA 135 using a second SSID 307.

Devices that are provisioned to interwork between a first network such as the WLAN 120 and a second network such as the WMAN 110 may search for an interworking SSID in the first network. The interworking AP 310 can use a link such as a networking standard to allow multiple bridged networks to transparently share a common physical network link. One such example that may be used is as an IEEE 802.1Q protocol to tunnel VLAN traffic to a tunnel termination point, such as an Ethernet switch or router 315. The use of an 802.1Q protocol can allow for separation of regular internet and interworked traffic and also allows a same internet protocol (IP) address allocation to various devices such as single radio STAs 140 and multiple radio STAs 135 on the same interworking AP 310. The switch/router 315 is linked to a network infrastructure 320 to provide access to internet and internet protocol services 350.

The switch/router 315 is also coupled to a WiFi interworking function (WIF) 325 element. The WIF 325 is a network element located between the first network and the second network and interfaces to both networks, such as a WiFi network of WLAN 120 and a WiMAX network of the WMAN 110. The WIF 325 functions as a data path and control path anchor on behalf of an interworked STA, such as the single radio STA 140 or the multi radio STA 135. The WIF 325 is further described below in reference to FIG. 4. In reference to FIG. 3, the WIF 325 interfaces with several elements of a WWAN 110 including an access service network gateway (ASN-GW) 335 through a first control line 326, an AAA 340 element through a second control line 327, and a home agent (HA) 345 through a first link 328 wherein solid lines indicate user traffic and dashed lines indicate control traffic. The HA 345 of the WMAN 110 is linked to the Internet/IP Services 350 element. The WMAN 110 also comprises other elements such as one or more base stations 330 linked to the ASN-GW 335.

In an embodiment, a STA such as the multi-radio station 135 or the single radio station 140 receives signals from the AP 125 in a first network, such as the WLAN 120. The STA investigates the signals to identify a SSID and determines, using the SSID whether the AP 125 supports interworking of networks to access a second network, such as the WMAN 110 using the first network. The STA then associates with the first network to access the second network using the WIF 325.

Figure 4:
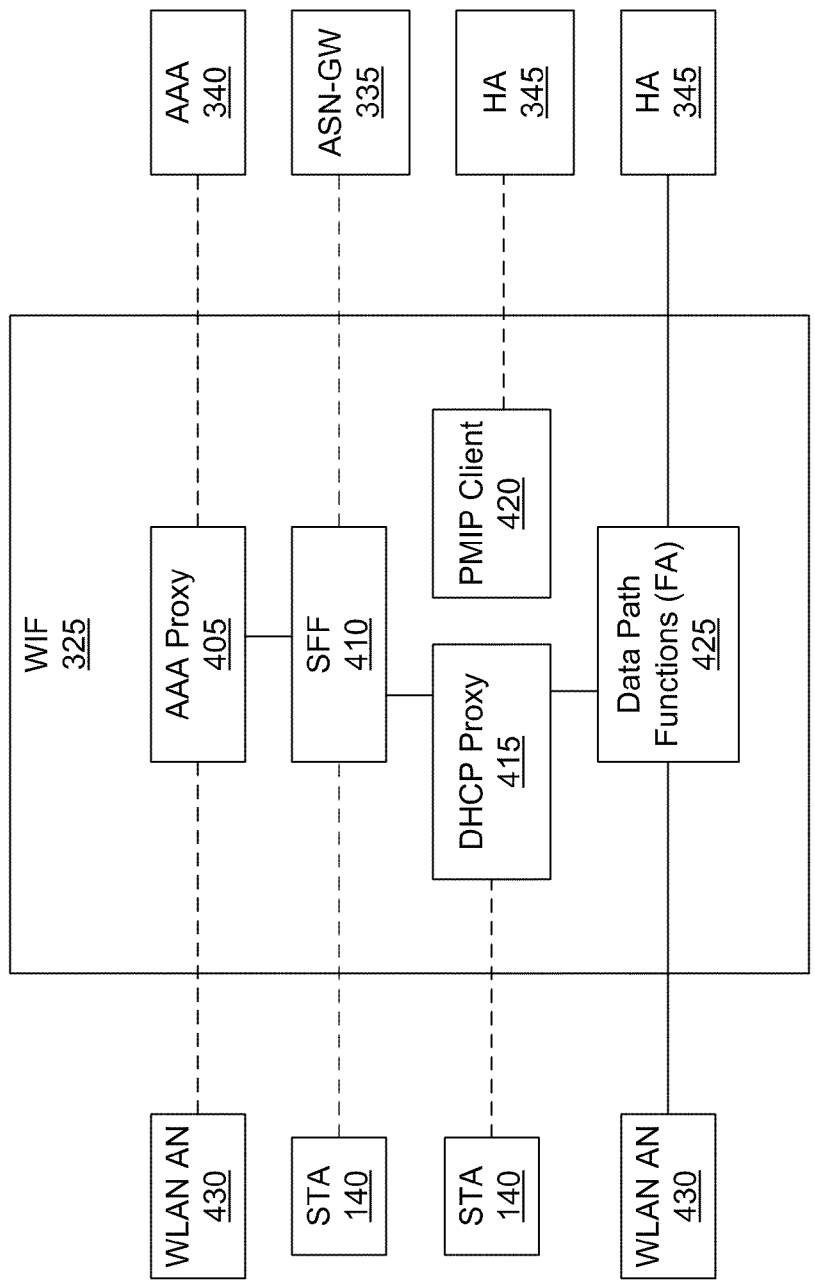
FIG. 4 is another block diagram illustrating an interworking function element in accordance with some embodiments.

FIG. 4 is another block diagram illustrating a WIF 325 element in accordance with some embodiments, wherein the WIF 325 element comprises an AAA proxy 405 for tunnel authentication, authorization, and accounting exchanges between the a WiFi access network (AN) 430 and the AAA 340 element, such as an AAA server. In FIG. 4, the solid lines indicate user traffic and dashed lines indicate control traffic.

The WIF 325 also comprises a singling forwarding function 410 to enable single radio handoff from the WLAN 120, which may be a WiFi network to the WMAN 110, which may be a WiMAX network. The WIF 325 also comprises a DHCP Proxy 415 to respond to client request(s) for IP address(es) and to trigger a proxy mobile IP (PMIP) procedure through a PMIP client 420 towards the HA 345. The WIF 325 further comprises a data path function or mobile IP foreign agent (FA) to facilitate data path tunneling from a WLAN access network (AN) 430 to the HA 345.

To support mobility, various scenarios need to be considered when determining a method for interworking of networks, as described below in Table 1:

TABLE 1

Handover Scenarios

| | Mobility Mode | Pre-existing Context |
|---|---|---|
| Scenario 1 | Idle | No context |
| Scenario 2 | Idle | With existing context |
| Scenario 3 | Active | No context |
| Scenario 4 | Active | With existing context |

In an embodiment, a method for interworking of networks includes receiving signals from a first network. The signals may be received by a STA such as the single-radio station 140 or a multi-radio station 135, from the WLAN 120 wherein the WLAN 120 is a WiFi network. The signals are investigated in the STA to determine if an access point (AP) in the first network deploys a virtual AP using a BSSID. It is determined, using the BSSID, whether the AP supports interworking of networks to access a second network using the first network. The STA associates with the first network to access the second network using a WiFi interworking function (WIF) 325 element.

Figure 5:
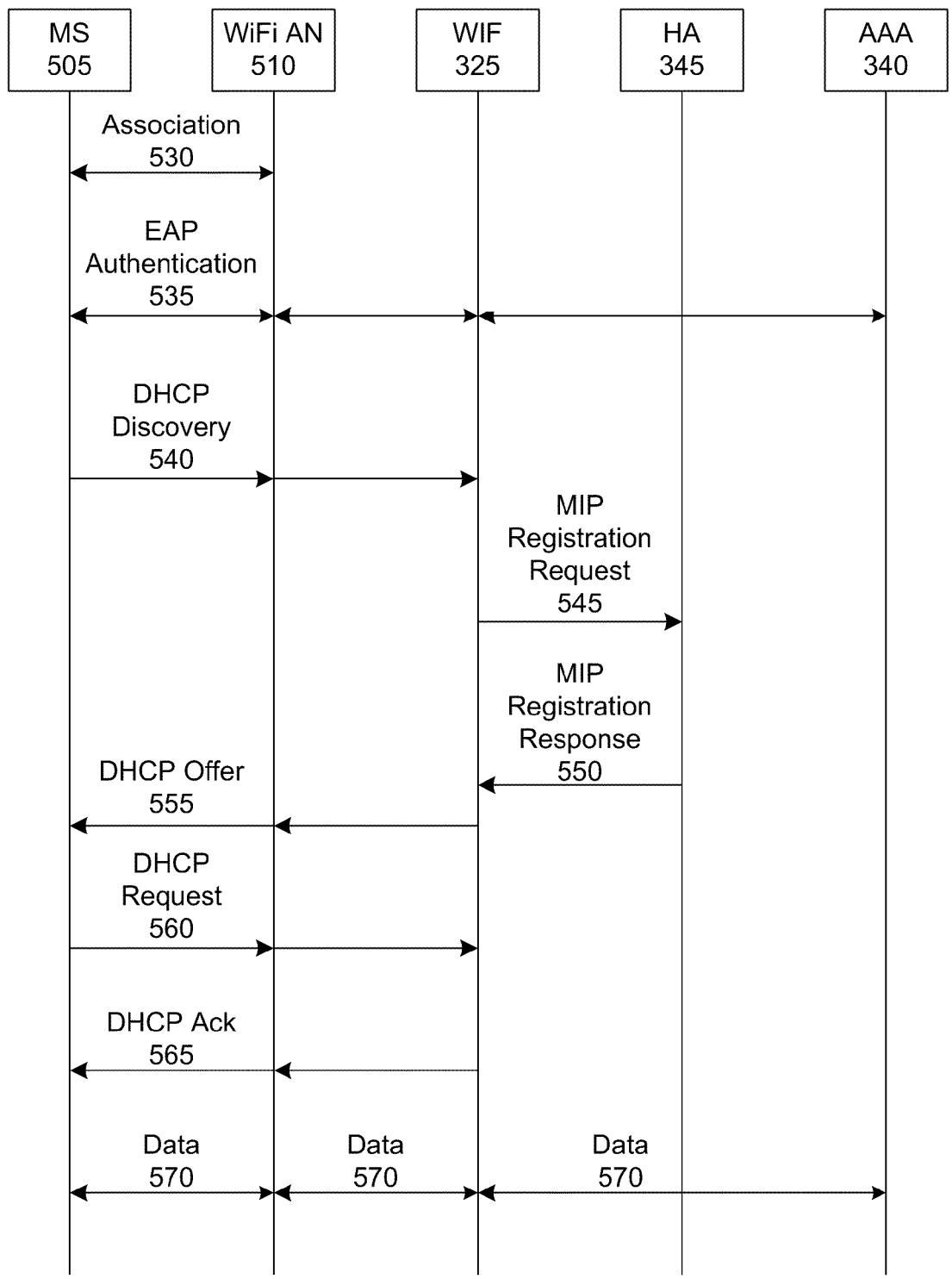
FIG. 5 illustrates network entry using an interworking function element in accordance with some embodiments.

FIG. 5 illustrates a network entry procedure for WiFi and WiMAX networks using a WIF 325 element, in accordance with some embodiments. Several elements are used in the procedure including a mobile station (MS) 505, which may be the single radio station 140 or the multi-radio station 135 of FIG. 1. Also used in the procedure are a WiFi AN 510, the WIF 325, the HA 345, and the AAA 340.

Access to a first network is established through association 530 of the MS 505 to the WiFi AN 510 by capturing WiFi signals by the MS 505 and performing WiFi network discovery and selection. The MS 505 authenticates with the core services network (CSN) of the WiMAX network by sending messages through the WiFi AN 510 and to the WIF 325 wherein the AAA proxy 405 facilitates authentication with the AAA 340 server for the MS 505. A DHCP discovery message 540 is sent from the MS 505 to the WIF 325 for discovery of a DHCP server. The DHCP proxy 415 in the WIF 325 may be used for discovery purposes. A mobile IP (MIP) registration request 545 may be sent to the HA 345 and a MIP registration response is sent to the WIF 325 to form a MIP tunnel. A DHCP offer 555 message is received by the MS 505 from the DHCP Proxy 415 in the WIF 325. The MS 505 responds to the DHCP offer 555 by sending a DHCP request 560 message to the DHCP proxy 415 in the WIF 325. A DHCP acknowledgement 565 message is sent by the DHCP proxy 415 in the WIF 325 to the MS 505 to provide for data 570 to be sent from the MS 505 from the WiFi network to the WiMAX network.

A method for network entry by a STA comprises receiving a first signal from a first network using the STA that is configured to communicate over the first network and a second network. The first network is a Wireless Fidelity (WiFi) network and the second network is a Worldwide Interoperability for Microwave Access (WiMAX) network. Association is established with the first network and the STA is authenticated in the second network by sending EAP messages to a WIF through AP. A DHCP discovery message is transmitted to discover a DHCP server. A DHCP offer message is received by the STA and a DHCP request message is sent in response. An acknowledgment is received from the WIF 325 and data is sent by the STA over the second network using the first network.

Figure 6:
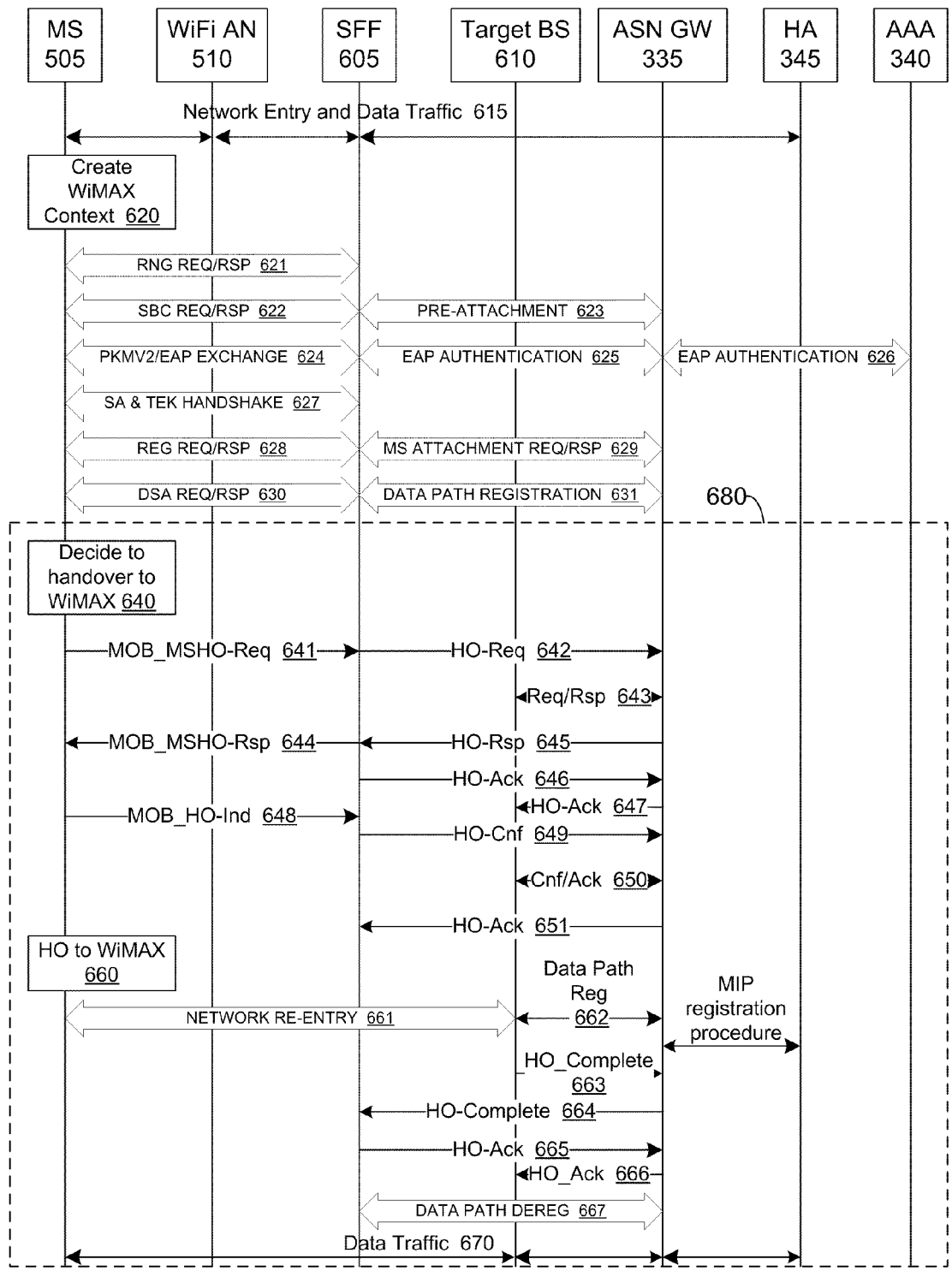
FIG. 6 illustrates a single radio handover with no pre-existing context in accordance with some embodiments.

FIG. 6 illustrates a single radio handover with no pre-existing context in accordance with some embodiments. Several elements are used in the procedure including the mobile station (MS) 505, which may be the single radio station 140 or the multi-radio station 135 of FIG. 1. Also used in the procedure is the WiFi AN 510, the HA 345, the AAA 340, a singling forwarding function (SFF) 605 used to enable single radio handoff from a WiFi network to a WiMAX network, a target base station (BS) in a WiMAX network, and the access service network gateway (ASN-GW) 335. The SFF 605 may also be referenced as the WIF 325.

The MS 505 in FIG. 6 enters a WiFi network 615, as an example, using a method as illustrated in FIG. 5 and as described above. The MS 505 detects availability of a WiMAX network, of interworking capability, discovers the SFF 605, and decides to create a WiMAX context 620. A series of messages or calls are exchanged including one or more of a ranging (RNG) request (REQ)/response (RSP) 621 between the MS505 and the SFF 605, a station basic capability (SBC) REQ/RSP 622 exchange, a pre-attachment 623 exchange, a privacy key management (PKM)/EAP exchange 624, an EAP authentication exchange 625, an EAP authentication exchange 626, security exchange (SA) traffic encryption key (TEK) handshake 627, a registration (REG) REQ/RSP 628, a MS Attachment REQ/RSP 629, a dynamic service allocation (DSA) REQ/RSP 630, and a Data Path Registration 631 exchange.

The MS 505 decides to handover to the WiMAX network in element 640 using single radio handover using a tunnel formed to the SFF 605 in the WiMAX network. A series of exchanges or calls are performed including one or more of a MOB mobile station handover (MOB_MSHO)-Req 641, a handover (HO) request 642, a Req/Rsp 643, a MOB-MSHO-Rsp 644, a HO-Rsp 645, a HO-Ack 646, a HO-Ack 647, a MOB_HO-Ind 648, a MOB_Cnf 649, a Cnf/Ack 650, and a HO-Ack 651. A single-radio handover to WiMAX 660 is performed using another series of messages or calls including one or more of a network re-entry 661, a data path registration 662, a HO_complete 663, a HO_complete 664, a HO-Ack 665, a HO-Ack 666, and a datapath deregistration 667 prior to establishment of data traffic 670. The dashed box 680 indicates a procedure for a single radio handover to a WiMAX network with pre-existing context.

In a related embodiment, a STA performs single radio handover using a method comprising connecting to a first network and detecting availability of a second network. The STA discovers an address of a signal forwarding function (SFF) or WIF 325 of the second network and establishes a tunnel to the SFF of the second network. The STA then performs initial entry to the second network over the tunnel and performs handover to the base station 105 in the second network. The first network may be a Wireless Fidelity (WiFi) network and the second network may be a Worldwide Interoperability for Microwave Access (WiMAX) network.

Figure 7:
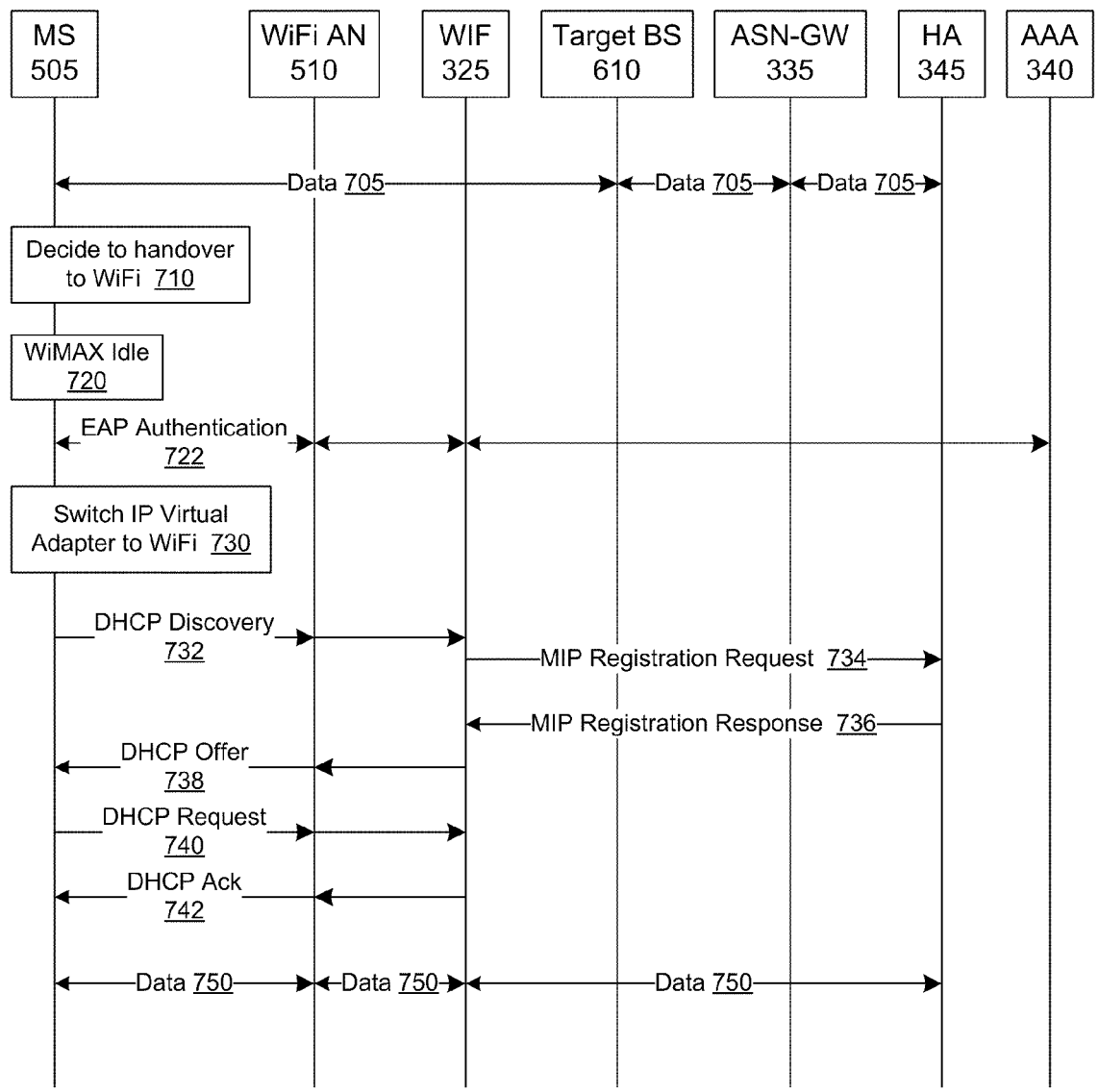
FIG. 7 illustrates a single radio handover in idle mode in accordance with some embodiments.

FIG. 7 illustrates a single radio handover to a WiFi network in idle mode in accordance with some embodiments. Several elements are used in the procedure including a mobile station (MS) 505, which may be the single radio station 140 or the multi-radio station 135 of FIG. 1. Also used in the procedure are a WiFi AN 510, the WIF 325, the target BS 610, the ASN-GW 335, the HA 345, and the AAA 340.

Data traffic 705 is exchanged between the MS 505, the target BS 610, and the HA 345 and a decision to handover to WiFi 710 is determined. With WiMAX idle 720, EAP authentication 722 messages or calls are exchanged between the MS 505, the WiFi AN 510, the WIF 325, and the AAA 340. A switch of an IP virtual adaptor to WiFi is performed in element 730. A DHCP discovery message 732 is sent from the MS 505 to the WIF 325 for discovery of a DHCP server. The DHCP proxy 415 in the WIF 325 may be used for discovery purposes. A mobile IP (MIP) registration request 734 may be sent to the HA 345 and a MIP registration response 736 is sent to the WIF 325. A DHCP offer 738 message is received by the MS 505 from the DHCP Proxy 415 in the WIF 325. The MS 505 responds to the DHCP offer 555 by sending a DHCP request 740 message to the DHCP proxy 415 in the WIF 325. A DHCP acknowledgement 742 message is sent by the DHCP proxy 415 in the WIF 325 to the MS 505 to provide for data 750 to be exchanged with the MS 505.

Figure 8:
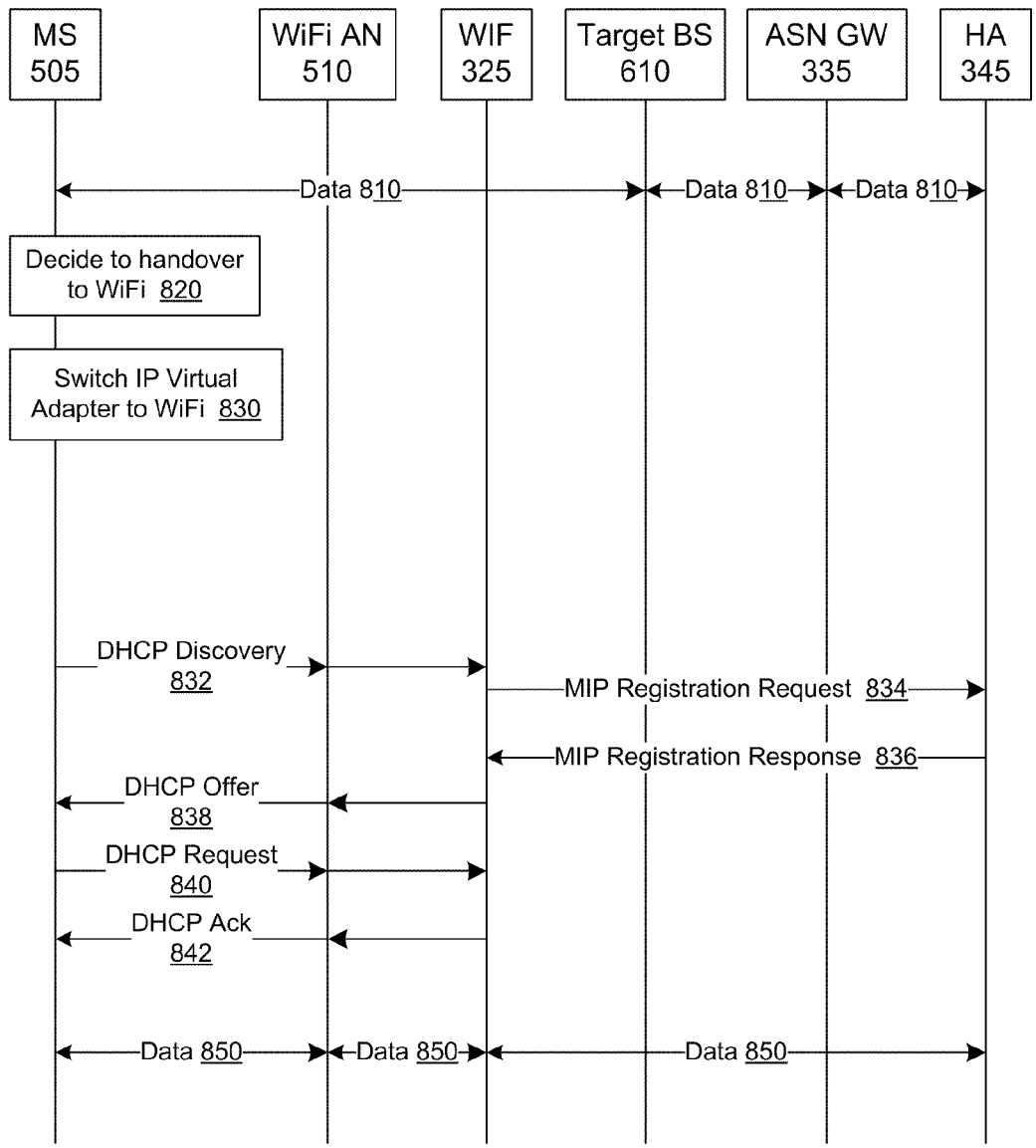
FIG. 8 illustrates a single radio handover with pre-existing context in accordance with some embodiments.

FIG. 8 illustrates a single radio handover to WiFi with pre-existing context in accordance with some embodiments. Data traffic 705 is exchanged between the MS 505, the WiFi AN 510, the WIF 325, the target BS 610, the ASN-GW 335, and the HA 345 and a decision to handover to WiFi 820 is determined. A switch of an IP virtual adaptor to WiFi is performed in element 830. A DHCP discovery message 832 is sent from the MS 505 to the WIF 325 for discovery of a DHCP server. A mobile IP (MIP) registration request 834 is sent to the HA 345 and a MIP registration response 836 is sent to the WIF 325. A DHCP offer 838 message is received by the MS 505 from the DHCP Proxy 415 in the WIF 325. The MS 505 responds to the DHCP offer 838 by sending a DHCP request 840 message to the DHCP proxy 415 in the WIF 325. A DHCP acknowledgement 842 message is sent by the DHCP proxy 415 in the WIF 325 to the MS 505 to provide for data 850 to be exchanged with the MS 505.

Figure 9:
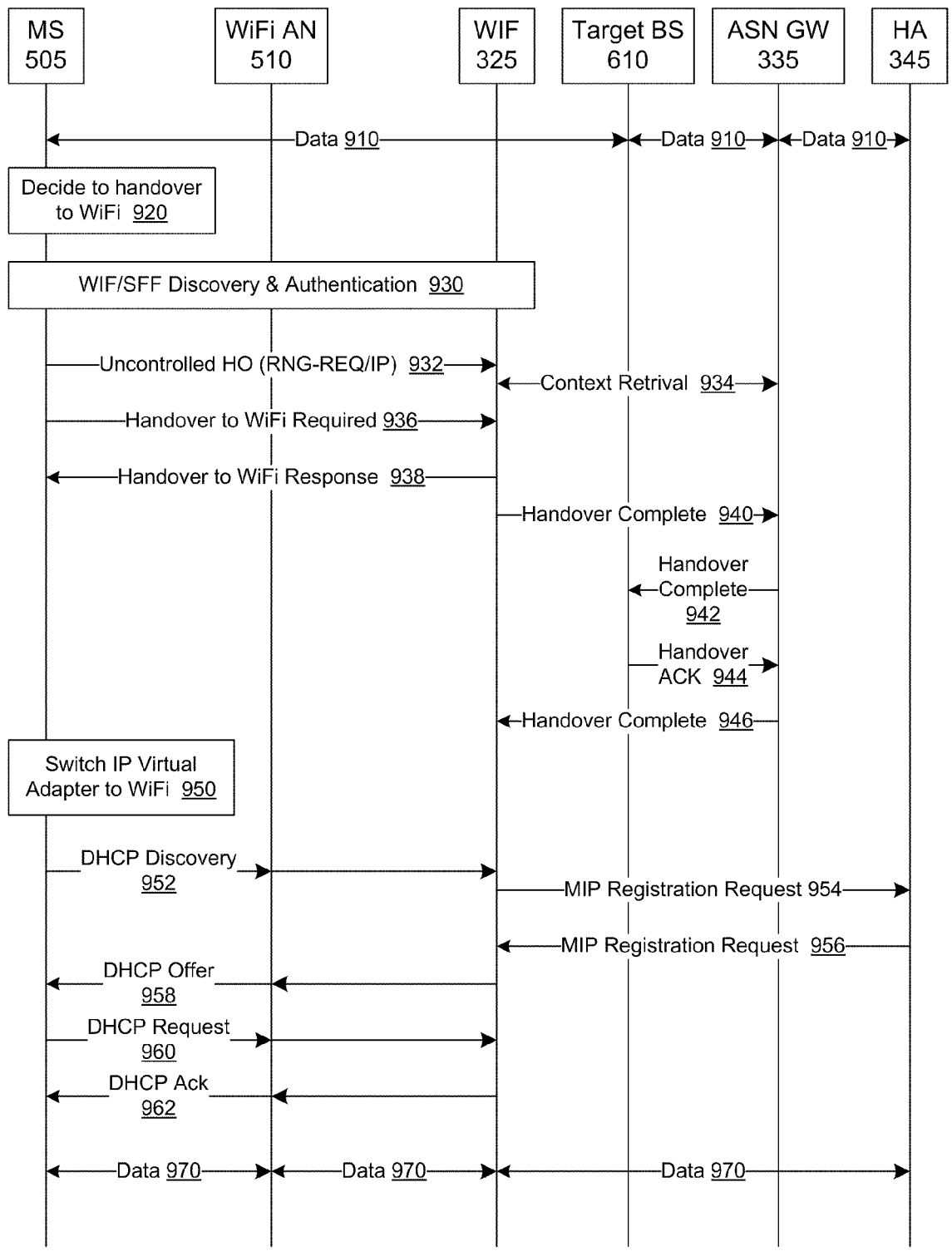
FIG. 9 illustrates a single radio handover with access control in an interworking function in accordance with some embodiments.

FIG. 9 illustrates a single radio handover with access control in the interworking function (WIF) in accordance with some embodiments. Data traffic 910 is exchanged between the MS 505, the target BS 610, the ASN-GW 335, and the HA 345 and a decision to handover to WiFi is determined in element 920. A WIF/SFF discovery and authentication process occurs in element 930 between the MS 505, the WiFi AN 510 and the WIF 325. A series of messages are exchanged between the MS 505, the WIF 325, the target BS 610, and the ASN-GW 335 including an Uncontrolled handover (HO) (RNG-REQ/IP) 932, a Context Retrieval 934, a Handover to WiFi Required 936, a Handover to WiFi Response 938, a Handover Complete 940, a Handover Complete 942, a Handover ACK 944, and a Handover Complete 946 message.

A switch of an IP virtual adaptor to WiFi is performed in element 950. A DHCP discovery message 952 is sent from the MS 505 to the WIF 325 for discovery of a DHCP server. A mobile IP (MIP) registration request 954 is sent to the HA 345 and a MIP registration response 956 is sent to the WIF 325. A DHCP offer 958 message is received by the MS 505 from the DHCP Proxy 415 in the WIF 325. The MS 505 responds to the DHCP offer 838 by sending a DHCP request 960 message to the DHCP proxy 415 in the WIF 325. A DHCP acknowledgement 962 message is sent by the DHCP proxy 415 in the WIF 325 to the MS 505 to provide for data 970 to be exchanged with the MS 505.

Figure 10:
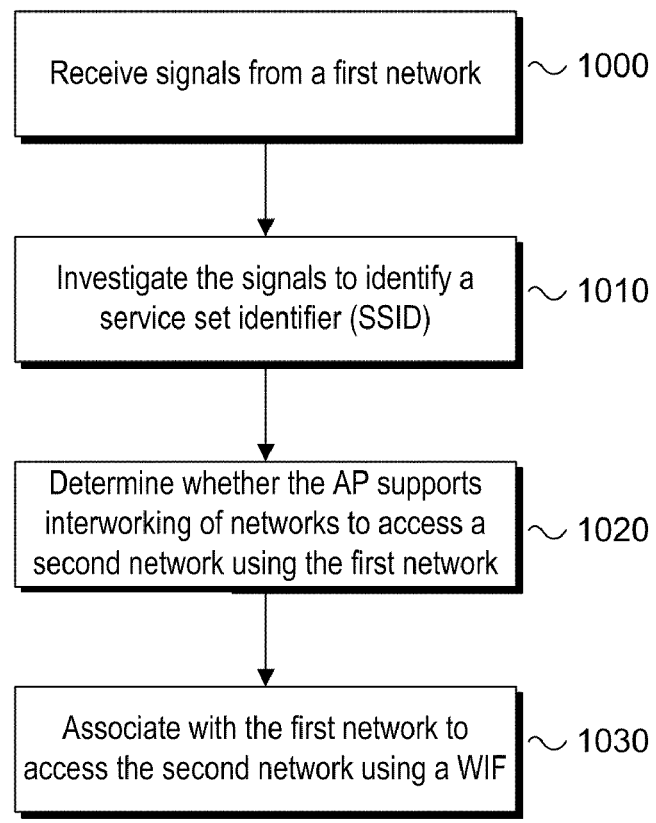
FIG. 10 is a flowchart of a method for interworking of networks in accordance with some embodiments.

FIG. 10 is a flowchart of a method for interworking of networks, which includes receiving signals from a first network in element 1000. The signals may be received by a STA from the WLAN 120 wherein the WLAN 120 is a WiFi network. The signals are investigated in the STA to identify a service set identifier (SSID) in element 1010. It is determined, using the SSID, whether the AP supports interworking of networks to access a second network using the first network in element 1020. The STA associates with the first network to access the second network using a WiFi interworking function (WIF) 325 element in element 1030.

Embodiments may be described herein with reference to data such as instructions, functions, procedures, data structures, application programs, configuration settings, etc. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by the wireless communications system 100, performs a desired transmission of signals. The programs in the wireless communications system 100 may be considered components of a software environment.

The operation discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for interworking of networks, comprising:
   receiving signals from an access point (AP) in a first network;
   investigating the signals to identify a service set identifier (SSID);
   determining, using the SSID, whether the AP supports interworking of networks to access a second network using the first network; and
   associating with the first network to access the second network using a Wireless Fidelity (WiFi) interworking function (WIF) element, wherein the WIF element comprises a singling forwarding function (SFF), and a mobile internet protocol (IP) foreign agent (FA), and wherein to access the second network includes using the mobile IP FA to tunnel from the first network to the second network.

2. The method of claim 1, wherein the AP is a carrier-class WiFi AP.

3. The method of claim 1, wherein the SSID is an interworking (IWK) SSID.

4. The method of claim 3, further including selecting the IWK SSID from a plurality of SSIDs, wherein each SSID is mapped into a separate virtual local area network (VLAN).

5. The method of claim 3, wherein the WIF element comprises an authentication, authorization, and accounting (AAA) function, and data path function.

6. The method of claim 1, wherein the SSID is a broadcast SSID.

7. The method of claim 1, wherein the first network is a WiFi network and the second network is a Worldwide Interoperability for Microwave Access (WiMAX) network.

8. A method for network entry, comprising:
   receiving a first signal from a first network using a station (STA) configured to communicate over the first network and a second network;
   establishing association with the first network;
   authenticating the STA in the second network by sending extensible authentication protocol (EAP) messages to a WiFi Interworking Function (WIF) through an access point (AP) enabling single radio handoff from the first network to the second network via a singling forwarding function (SFF) in the WIF;
   transmitting a dynamic host configuration protocol (DHCP) discovery message to discover a DHCP server;
   receiving a DHCP Offer message;
   responding to the DHCP Offer message with a DHCP Request message;
   receiving an acknowledgement from the WIF element; and
   transmitting data over the second network using the first network via a mobile internet protocol (IP) foreign agent (FA) in the WIF.

9. The method of claim 8, wherein the first network is a Wireless Fidelity (WiFi) network and the second network is a Worldwide Interoperability for Microwave Access (WiMAX) network.

10. The method of claim 9, wherein the STA authenticates in the second network by sending extensible authentication protocol (EAP) messages to an authentication, authorization, and accounting (AAA) proxy in the WIF.

11. The method of claim 8, wherein the DHCP discovery message is sent to the WIF.

12. The method of claim 8, wherein the DHCP Offer message is received from the WIF.

13. The method of claim 12, wherein the DHCP Request message is transmitted to the WIF.

14. The method of claim 8, wherein the AP is configured to provide multiple Broadcast Service Set Identifier (BSSID) support.

15. An article comprising a tangible machine readable medium that stores a program, the program being executable by a machine to perform a method, comprising:
- receiving signals from an access point (AP) in a first network;
- investigating the signals to identify a service set identifier (SSID);
- determining, using the SSID, whether the AP supports interworking of networks to access a second network using the first network; and
- associating with the first network to access the second network using a Wireless Fidelity (WiFi) interworking function (WIF) element, wherein the WIF element comprises a singling forwarding function (SFF), and a mobile internet protocol (IP) foreign agent (FA), and wherein to access the second network includes using the mobile IP FA to tunnel from the first network to the second network.

16. The article of claim 15, wherein the SSID is an interworking (IWK) SSID.

17. The article of claim 15, wherein the first network is a WiFi network and the second network is a Worldwide Interoperability for Microwave Access (WiMAX) network.

* * * * *